United States Patent Office 3,262,790
Patented July 26, 1966

3,262,790
DECORATING COMPOSITIONS CONTAINING SILVER CARBOXYLATE-AMINE COORDINATION COMPOUNDS AND METHOD OF APPLYING SAME
Howard M. Fitch, Summit, N.J., assignor to Engelhard Industries, Inc., Newark, N.J., a corporation of Delaware
No Drawing. Filed Aug. 1, 1962, Ser. No. 213,865
9 Claims. (Cl. 106—1)

This invention relates to silver carboxylate-amine coordination compounds and more particularly to decorating compositions containing such coordination compounds, a method of decorating employing such compositions, and the coordination compounds per se.

Silver sulforesinate has been used for many years in decorating compositions. While such decorating compositions are satisfactory in many respects, these compositions have been disadvantageous from the standpoint of their storage stability not being that desired and varying from lot to lot. Further, these silver sulforesinate-containing decorating compositions require firing at relatively high temperatures and because of the high firing temperatures, it is not possible to attain a silver film of "mirror brightness." The metallic films obtained by the high temperature firing are dull and matte in appearance, which is apparently due to either formation of silver oxides or sintering of the metallic film. When decorating glass substrates, there is also a tendency for the silver to migrate into the interior of the glass substrate and be lost at the high temperatures of the firing.

I have investigated a number of silver carboxylates for use in decorating compositions such as, for instance, silver acetate, silver benzoate and silver stearate, and have found these carboxylates much too insoluble in organic solvents to be useful in decorating compositions. Although silver naphthenate and silver hydrogenated rosinate were found to have a high solubility in organic solvents and to fire at relatively low temperatures, these materials form viscous gels with organic solvents that remain viscous at considerable dilutions. This gelling makes these materials unsuitable for use in decorating compositions.

In accordance with the present invention, I have now found that silver carboxylate-amine coordination compounds obtained by reacting the amine with the carboxylate in the proportions of from about 0.05 mole to not in excess of one mole of the amine per mole of the silver carboxylate, preferably from about 0.1 to not in excess of one mole of the amine per mole of the carboxylate, are especially well suited for combining with an organic decorating vehicle and, if required as hereinafter discussed, also with a flux for the silver for use as silver decorating compositions. The decorating compositions are a considerable improvement in this art from the standpoint of: (1) being capable of being fired at low or moderately high temperatures to attain silver films of "mirror brightness"; (2) having little or no tendency for the silver to migrate into the interior of glass substrates due to the lower temperatures employed; and (3) forming metallic films of good thickness without the requirement of "damming up" the applied decorating composition on the substrate.

It is important that the amine not be reacted with the silver carboxylate much in excess of one mole of amine per mole of the carboxylate, inasmuch as much in excess of one mole of amine per mole of carboxylate results in an inferior decoration of the silver on the substrate or article being decorated due to too little silver being deposited thereon. For instance, silver carboxylate-amine coordination compounds or complexes obtained by reacting two or more moles of amine with one mole of the carboxylate are unsatisfactory for use in decorating compositions for the reason there is too much amine in the complex, and hence a satisfactory silver decoration is not obtained on the article by the firing of the applied composition. While is may be possible to obtain satisfactory silver decorations using such complexes containing these greater amounts of amines by "damming up" the applied film to a thicker deposit, such procedure requires special apparatus, is time-consuming and tends to be troublesome, and hence is not satisfactory from a commercial standpoint. Further, the reaction of the amine in quantities much in excess of one mole per mole of the silver carboxylate is disadvantageous when the complex is intended for use in decorating compositions for the reason that the reaction of the greater amounts of amine tends to result in sagging or running of the applied decoration during firing, causing ragged and uneven edges and producing a metallic film of uneven thickness and generally poor appearance.

The organic decorating vehicle of this invention, with which the coordination compound is combined in preparing the decorating compositions, is also an important part of this invention. It is to be understood that this decorating vehicle is not simply a single solvent but instead a mixture of two or more of the materials hereafter disclosed. Use of a single vehicle or solvent tends to be disadvantageous from the standpoint of not depositing a satisfactory metallic film on the article being decorated. In a composition to be applied by brushing, for example, it is virtually impossible to obtain with a single solvent the properties of smooth flow from the brush, leveling, non-running and the like that are essential to the deposit of an even film having sharp boundaries. Similarly, in a composition to be applied by screen printing, the use of a single solvent of high volatility, for instance chloroform, tends to cause clogging of the screen due to premature volatilization of the solvent during screening, while the use of a single solvent of low volatility, for instance cyclohexanone, tends to cause smearing and running of the applied design due to the very slow evaporation of solvent from the film after screening. A single solvent of intermediate volatility tends to clog the screen and also smear and run, and a satisfactory vehicle can only be obtained with a mixture of two and preferably more components. The choice of the particular organic decorating vehicle utilized controls the behavior of the composition before firing and is dictated by the method by which the composition is to be applied. The particular ingredients selected for the decorating vehicle are carefully selected or chosen to impart specific physical properties to the composition. These properties, such as oiliness, viscosity, evaporation rate, surface tension and tack will vary for different methods of application such as, for instance brushing, spraying, stippling, stamping, printing, both direct and offset, hot or cold screen printing, stenciling and decalcomania transfer. The organic decorating vehicle will include mixtures of two or more of the following ingredients, for example, methyl ethyl ketone, cyclohexanone, ethyl acetate, amyl acetate, Cellosolve, butanol, nitrobenzene, toluene, xylene, petroleum ether, chloroform, carbon tetrachloride, terpenes such as for instance pinene, dipentene, dipentene oxide, and the like, essential oils such as for instance, oils of lavender, rosemary, aniseed, sassafras, wintergreen, fennel and turpentine, Assyrian asphalt, various rosins and balsams, and synthetic resins. Lacquers can also be incorporated in decorating compositions of this invention containing the organic decorating vehicle. For decorating compositions formulated for high firing film deposition, higher molecular weight constituents such as the synthetic resins are employed in the organic decorating vehicles inasmuch as the synthetic resins are of sufficiently high viscosity at the high firing temperatures so as not to run or flow to ruin the decoration. However, the high temperatures of the firing will still remove or drive off the synthetic resin and the remainder of the decorating vehicle, which would not be effected at low firing temperatures, to leave the metallic decorative film. For decorating compositions formulated for firing at low temperatures, lower molecular weight constituents such as two or more of the lower molecular weight ingredients previously disclosed would be used. The term "organic decorating vehicle" is used herein and in the appended claims to mean a vehicle composition containing two or more of the ingredients previously disclosed or two or more equivalents thereof.

In addition to the organic decorating vehicle, the decorating compositions of this invention will contain a flux for the silver when moderate and high temperature firing conditions are to be employed. The choice of ingredients for the flux determines the behavior of the silver film during and after firing and is usually dictated by the composition of the article to be decorated and the use for which it is intended. The flux will usually contain small amounts of salts or resinates of rhodium or iridium to improve the continuity and brilliance of the silver film. Other ingredients, such as salts and resinates of bismuth, chromium, lead, cadmium, tin, copper, cobalt, antimony and uranium are employed to improve the adherence of the silver film and its resistance to abrasion. The ingredients fuse to a low melting glass or glaze and are well understood by those skilled in the art of compounding glazes and porcelain enamels. The conventional glazes cannot be used to promote adherence of the silver film to non-refractory materials such as plastics, wood, paper and the like, and the silver film on such material usually will be protected by a coating of a lacquer or varnish, or by laminating a thin film of plastic to the surface.

The silver carboxylate and amine are reacted in preparing the coordination compound by mixing together the carboxylate and the amine in the proportions specified. The reaction is exothermic in nature, and it is preferable to add one reactant to the other slowly or in increments with cooling to maintain the temperature of the reaction mixture preferably below 100° C. Reaction temperature of from about 20°–50° C. are especially preferred. The reaction is facilitated by employing an organic liquid solvent such as, for example, toluene, chloroform, isopropanol, cyclohexanone or turpentine in the reaction mixture. It is not necessary to isolate or purify the coordination compound formed, and it may be advantageously prepared in the organic decorating vehicles of the decorating compositions in which it is to be used.

Silver carboxylates which can be reacted with the amine include the silver salts of aliphatic, alicylic, heterocyclic, aryl, alkaryl and aralkyl carboxylic acids. Exemplary of such silver carboxylates are silver butyrate, silver hexoate, silver 2-ethylhexoate, silver isodecanoate, silver laurate, silver palmitate, silver stearate, silver 10-undecenoate, silver oleate, silver cyclohexane carboxylate, silver naphthenate, silver hydrogenated rosinate, silver abietate, silver furoate, silver benzoate, silver 2-naphthoate, silver p-tert.-butylbenzoate, silver 2,4-dimethylbenzoate, silver phenyl acetate, silver diphenyl acetate, silver 2-phenyl butyrate, silver cinnamate, silver camphorate and silver levulinate. Silver salts of mixed carboxylic acids of commercial quality such as, for example, the acid obtained by hydrolyzing natural oils such as coconut oil or palm oil may also be employed. Silver hydrogenated rosinate, silver abietate and silver naphthenate are preferred inasmuch as they give amine complexes of very high solubility in organic vehicles. Silver naphthenate is particularly preferred for forming amine complexes that fire to brilliant, specular silver films.

Suitable amines for forming the coordination compounds include the aliphatic, alicyclic, heterocyclic, aryl and aralkyl amines and may be primary, secondary or tertiary amines. Exemplary of such amines are butyl amine, isoamyl amine, 2-ethylhexyl amine, tert.-octyl amine, lauryl amine, stearyl amine, oleyl amine, dibutyl amine, diamyl amine, dioctyl amine, dilauryl amine, dioleyl amine, triamyl amine, trilauryl amine, cyclohexyl amine, pyridine, piperidine, morpholine, aniline, benzyl amine, 1-naphthyl amine, N-methylbenzyl amine, and N,N-dimethylbenzyl amine. Commercial mixtures of amines of various chain lengths and configurations may also be employed. Primary and secondary amines are preferred over tertiary amines, as they give more stable coordination compounds with silver carboxylates. Amines having a boiling point at atmospheric pressure above 100° C. are preferred and amines boiling at atmospheric pressure above 200° C. are particularly preferred because the higher boiling amines give silver carboxylate-amine coordination compounds that are more stable under conditions where evaporation may occur.

Most silver carboxylates are insoluble in organic vehicles and the amount of silver that can be obtained in solution with them at ordinary temperatures is less than 0.1 percent by weight. Even silver carboxylates containing long carbon chains such as silver stearate have negligible solubility in organic vehicles. In the form of their amine coordination compounds according to the present invention however, the silver carboxylates have appreciable solubility in organic vehicles. As previously disclosed, the presence of the amine in excess of one molar proportion does not enhance the solubility of the silver carboxylate-amine coordination compounds or improve their utility in decorating compositions and has the disadvantage of decreasing the silver content. For silver carboxylates of low solubility in organic vehicles, for instance silver stearate, silver 2-ethylhexoate or silver benzoate, one mole of amine per mole of the silver carboxylate is preferred to obtain adequate solubility for decorative purposes.

Certain silver carboxylates, particularly silver naphthenate and silver hydrogenated rosinate, do have substantial solubility in organic vehicles as previously disclosed. Their solutions are gelatinous, however, and at any practicable concentration are too viscous to be useful in decorating compositions. It has been found that the addition of as little as 0.05 mole of amine per mole of silver carboxylate to such gelatinous solutions appreciably diminishes their gelatinous nature, and the addition of as small an amount as from about 0.1–0.6 mole of amine per mole of the silver carboxylate decreases the viscosity of such solutions sufficiently to make them especially suitable for use in decorating compositions. As an example of the remarkable decrease in viscosity obtained by adding small amounts of amine to silver naphthenate solutions, silver naphthenate was dissolved in toluene containing varying amounts of dibutyl amine, the solutions were adjusted with toluene to a silver content of 15 percent, and the viscosities were determined. With silver naphthenate alone in toluene, the viscosity was 26.6 poises. With silver naphthenate plus 0.05 molar proportion of dibutyl amine in toluene, the viscosity was 1.0 poise. With silver naphthenate plus 0.1 molar proportion of dibutyl amine in toluene, the viscosity was 0.32 poise. With further addition of amine, the viscosity was below 0.32 poise. This was surprising and unexpected, as it was expected that the use of less than a molar proportion of amine would form an equimolar coordination compound in an amount corresponding to the amount of amine present, and that any excess of silver carboxylate would still be present in a gelatinous state. Such compositions, containing from about 0.1–0.6 mole amine per mole of silver naphthenate or silver hydrogenated rosinate, are particularly desirable and preferred because of their high silver content and because they give decorating compositions that fire to brilliant, specular silver films.

While the silver carboxylate-amine coordination compounds have good stability in closed containers, they tend to lose amine by evaporation from open containers. Loss of amine can also occur when the vehicles are allowed to evaporate from thin films of decorating compositions containing such coordination compounds prior to firing the film. Loss of amine can result in some precipitation of insoluble silver carboxylates to the detriment of the metallic film obtained on firing the decorating composition. This effect is less pronounced with the amines boiling above 100° C. and becomes negligible with the amines boiling above 200° C.

The decorating compositions of the invention give bright silver mirrors when applied to nonporous substrates and heated in the range of about 200–300° C. Heating by infra-red radiation is particularly advantageous, since the formation of a silver mirror gives a heat reflective surface that tends to prevent over-heating. At temperatures in excess of 300° C., the silver film loses its specular character and becomes matte unless rhodium or iridium are present in the decorating composition. For nondecorative uses, such as for forming resistors or electrical contacts, a specular film is not required, and these films may be fired to temperatures of 600° C. or above in the absence of rhodium or iridium. It has been customary to use compositions containing finely divided metallic silver for such high firing compositions. The compositions of the present invention have the advantage of giving a smoother film, even though matte, and better coverage with greater conductivity for a given amount of silver than the compositions of the prior art containing metallic silver powder. The matte films obtained at higher temperatures may also be burnished to a soft lustrous silver film for decorative purposes. It is known that when silver films on glass are heated near the softening point of the glass, silver ions migrate into the surface of the glass to give yellow to amber stains. The decorating compositions of the invention are suitable for obtaining such stains on glass.

The invention is further illustrated by the following examples. Parts and percentages therein are by weight unless otherwise stated.

EXAMPLE I

A mixture of 696 parts of silver hydrogenated rosinate containing 21.55% Ag and 304 parts of toluene was prepared as a clear solution containing 15% Ag. 134 parts of this solution were mixed with 14 parts of 2-ethylhexylamine, 30 parts of nitrobenzene, and 22 parts of oil of rosemary to give a clear solution containing 10.05% Ag. This composition contained about 0.6 mole of 2-ethylhexylamine per mole of silver hydrogenated rosinate. This solution of the silver hydrogenated rosinate–2-ethylhexylamine coordination compound was applied by brushing to glass slides and baked 6½ inches away from a 6000 watt infrared source for 12 minutes to give a bright conductive silver film. The same solution was also applied to a piece of fiberglass laminated plastic and heated under the same conditions to give a bright conductive silver film after about 5 minutes.

EXAMPLE II

A mixture of 47 parts of silver 2-ethylhexoate containing 42.78% Ag, 29 parts of diamylamine, 64 parts of oil of rosemary, 20 parts of a solution of rhodium resinate dissolved in a mixture of essential oils and hydrocarbons (1% Rh) and 40 parts of rosin solution containing 50% rosin was prepared as a clear solution containing 10.05% Ag and 0.1% Rh. This composition contained one mole of diamylamine per mole of the silver 2-ethylhexoate. This solution of the silver 2-ethylhexoate–diamylamine coordination compound was applied by brushing to soda lime glass and baked 6½ inches away from a 9000 watt infrared source for about 5 minutes to give a conductive bright silver film.

EXAMPLE III

A mixture of 47 parts of silver 2-ethylhexoate containing 42.78% Ag, 24 parts of 2-ethylhexylamine, 50 parts of oil of rosemary and 79 parts of rosin solution containing 50% rosin was prepared as a clear solution containing 10.05% Ag. This composition contained one mole of the 2-ethylhexylamine per mole of the silver 2-ethylhexoate. This solution of the silver 2-ethylhexoate–2-ethylhexylamine coordination compound was applied by brushing to a piece of soda lime glass and baked 6½ inches away from a 9000 watt infrared source for about five minutes to produce a conductive bright silver film.

EXAMPLE IV

A mixture of 140 parts of silver 2-ethylhexoate containing 42.78% Ag, 88 parts of diamylamine, 176 parts of oil of rosemary, 60 parts of a solution of rhodium resinate dissolved in a mixture of essential oils and hydrocarbons (1% Rh), 111 parts of solution of rosin in oil of turpentine (50% rosin), 20 parts of a solution of bismuth resinate dissolved in a mixture of essential oils (4.5% Bi) and 5 parts of a solution of chromium resinate dissolved in a mixture of cyclohexanone and oil of turpentine (2.05% Cr) was prepared as a clear solution. This composition contained one mole of diamylamine per mole of the silver 2-ethylhexoate. This solution of the silver 2-ethylhexoate–diamylamine coordination compound which contained 9.98% Ag, 0.1% Rh, 0.15% Bi and 0.017% Cr, was applied by brushing to a variety of substrates and a metal film developed as shown in the following table. All films were adherent and were good conductors of electricity.

Table

| Substrate | Firing conditions | Appearance of Ag film |
|---|---|---|
| Soda lime glass panel | 6½ inches from 9,000 watt infrared heaters for 4–5 min. | Bright. |
| Soda lime glass tumbler. | Lehr 600° C. | Do. |
| Do | Kiln 600° C., 10 min. soak. | Light application: bright; heavy application: dull, burnishes to a lustrous silver film. |
| Tempered soda lime opal glass dish. | Kiln 630° C., 5 min. soak. | Bright. |
| Borosilicate clear glass panel. | Kiln 650° C., 5 min. soak. | Semi-bright, burnishes to a lustrous silver film. |
| Borosilicate opal glass dish. | Lehr 600° C. | Birght. |
| Do | Kiln 650° C., 5 min. soak. | Matte, burnishes to a lustrous silver film. |
| Glazed earthenware tile. | Kiln 740° C., 5 min. soak. | Semi-bright, burnishes to a lustrous silver film. |
| Hard porcelain dish | Kiln 800° C., 5 min. soak. | Semi-bright, bright when lightly burnished. |
| Fused quartz panel | Kiln 650° C., 5 min. soak. | Bright. |
| Dish made of a glass ceramic known as Pyroceram. | Lehr 600° C. | Do. |
| Porcelain enamel on steel panel. | Kiln 600° C. flash fired 30 sec. | Do. |
| Porcelain enamel on aluminum panel. | Kiln 600° C. flash fired 1¼ min. | Semi-bright, bright when lightly burnished. |
| Sheet mica | Infrared heaters, ca. 250° C. 20 min. | Semi-bright. |
| Aluminum panel | Kiln 600° C. flash fired 1 min. | Matte, burnishes to lustrous silver film. |
| Stainless steel panel | Kiln 600° C. flash fired 2 min. | Do. |
| Titanium panel | Infrared heaters, ca. 250° C. 15 min. | Do. |
| Fiberglass laminated plastic panel. | Infrared heaters, ca. 250° C. 10 min. | Bright. |

In the above table, where kiln firing is specified it is to be understood that the pieces were placed in a kiln at ambient temperature which was then heated to a specified temperature, held at about this temperature for 5 or 10 minutes as noted and cooled, the total operation requiring an hour or more. Where flash firing is specified, the pieces were placed in a kiln preheated to the specified temperature and were removed after the specified time interval. Where lehr firing is specified, the pieces were passed through a continuous lehr having a specified peak temperature, passage through the lehr requiring from one and one-fourth to one and one-half hours.

As an example of the utility of the compositions of the invention for attaching electrical contacts or wire to nonconductive substrates, the above composition of Example IV, brushed on glass and kiln fired to 600° C., 10 minute soak, gave a highly conductive film that was readily solderable.

EXAMPLE V

The composition of Example IV containing one mole of diamylamine per mole of silver 2-ethylhexoate, when brushed on a soda lime glass tumbler and fired in a lehr to 600° C., gave an attractive, dense, uniform, highly conductive, bright silvery film having sharp boundaries. When a composition containing two moles of diamylamine, i.e., 176 parts rather than 88 parts, per mole of silver 2-ethylhexoate and otherwise identical to the composition of Example IV was applied and fired in a substantially identical manner, the film obtained was thin, non-uniform, conductive only in some areas, had ragged boundaries and was generally unattractive.

EXAMPLE VI

When a composition containing three moles of diamylamine, i.e., 264 parts rather than 88 parts, per mole of silver 2-ethylhexoate and otherwise identical to the composition of Example IV was applied and fired in a lehr to 600° C., the film obtained was very thin and non-uniform with only a faint silvery appearance and was conductive only in a few areas.

EXAMPLE VII

A mixture consisting of 5 parts of silver naphthenate containing 31.95% Ag, 5 parts of toluene, 5 parts of sandalwood oil and 1 part of didodecylamine was heated on the steam bath to a final weight of 11.2 parts, containing 14.25% Ag. The composition contained about 0.2 mole of didodecylamine per mole of the silver naphthenate. The mixture was passed through a steel roller mill until a smooth buttery paste was obtained. This paste containing the silver naphthenate-didodecylamine coordination compound was screen-printed through a 196 mesh Nitex screen onto glass and baked 7 inches away from a 9000 watt infrared source for five minutes to give a bright conductive film.

EXAMPLE VIII

A mixture consisting of 5 parts of silver naphthenate containing 31.95% Ag, 5 parts of toluene, 5 parts of oil of peppermint and 1 part of didodecylamine was heated on the steam bath to a final weight of 10 parts containing 16% Ag. The composition contained about 0.2 mole of didodecylamine per mole of the silver naphthenate. The mixture was passed through a steel roller mill until a buttery uniform paste was obtained. This paste containing the silver naphthenate-didodecylamine coordination compound was screen-printed through a 196 mesh Nitex screen onto glass and baked 7 inches away from a 9000 watt infrared source for five minutes to give a bright conductive film.

EXAMPLE IX

A mixture consisting of 5 parts of silver naphthenate containing 31.95% Ag, 5 parts of toluene, 5 parts of cedrol and 1 part of didodecylamine was heated on the steam bath to final weight of 11 parts, containing 14.5% Ag. The composition contained about 0.2 mole of didodecylamine per mole of silver naphthenate. The composition or mixture containing the silver naphthenate-didodecylamine coordination compound was run once through a steel roller mill and screen-printed through a 196 mesh Nitex screen onto glass. The resulting print was baked 4 inches away from a 6000 watt infrared source for 5 minutes and gave a conductive film. A semi-bright conductive film was obtained by heating in a kiln at 300° C.

EXAMPLE X

A mixture consisting of 5 parts of silver naphthenate containing 31.95% Ag, 4 parts of toluene, 4 parts of oil of spike and 1 part of didodecylamine was heated on the steam bath to a final weight of 10 parts, containing 16% Ag. The composition contained about 0.2 mole of didodecylamine per mole of silver naphthenate. The mixture or composition containing the silver naphthenate-didodecylamine coordination compound was run once through a steel roller mill and screen-printed through a 196 mesh Nitex screen onto glass. The resulting print was baked 4 inches away from a 6000 watt infrared source for 5 minutes and gave a conductive film. A conductive film was also obtained by heating in a kiln at 250° C.

EXAMPLE XI

A mixture consisting of 5 parts of silver naphthenate containing 31.95% Ag, 5 parts of toluene, 4 parts of pine oil and one part of didodecylamine was heated on the steam bath to a final weight of 10 parts, containing 16% Ag. The composition contained about 0.2 mole of didodecylamine per mole of silver naphthenate. The composition or mixture which contained the silver naphthenate-didodecylamine coordination compound was run once through a steel roller mill to give a fluid product which was screen-printed onto glass through a 196 mesh Nitex screen. The resulting print was baked 4 inches away from a 6000 watt infrared source for five minutes and gave a bright conductive film.

EXAMPLE XII

A mixture of 50 parts of silver naphthenate, containing 31.95% Ag, 50 parts of toluene, 40 parts of sandalwood oil and 10 parts of didodecylamine was prepared by heating on the steam bath to a final weight of 100 parts, containing 16% Ag. This composition contained about 0.2 mole of didodecylamine per mole of the silver naphthenate. 20 parts of the resulting solution of silver naphthenate-didodecylamine coordination compound were mixed with 6.65 parts by weight of an aromatic hydrocarbon solvent to give a solution containing 12% Ag. Two further solutions were prepared by mixing 5 parts of this solution with respectively 1 part of an indium resinate solution containing 2% In, and 1 part of a rhodium resinate solution containing 1% Rh. Equal parts of the latter two solutions were mixed to produce a solution which was banded on glazed earthenware and fired in a kiln at 740° C. to produce a matte silver film. When this solution was banded on window glass and fired in a kiln to 600° C. a bright metallic film was produced.

It will be obvious to those skilled in the art that many modifications may be made within the scope of the present invention without departing from the spirit thereof, and the invention includes all such modifications.

What is claimed is:

1. A decorating composition comprising a silver carboxylate-amine coordination compound and an organic decorating vehicle therefor, the coordination compound being obtained by reacting at a temperature below 100° C. an amine with a preformed silver carboxylate in the proportions of from about 0.05 mole to not in excess of one mole of the amine per mole of the silver carboxylate.

2. A decorating composition comprising a silver carboxylate-amine coordination compound, a flux for the silver, and an organic decorating vehicle for the coordination compound and flux, the coordination compound being obtained by reacting at a temperature below 100° C. an amine with a preformed silver carboxylate in the proportions of from about 0.05 mole to not in excess of one mole of the amine per mole of the silver carboxylate.

3. The decorating composition of claim 1 wherein the silver carboxylate is silver naphthenate.

4. The decorating composition of claim 1 wherein the silver carboxylate is silver hydrogenated rosinate.

5. The decorating composition of claim 1 wherein the silver carboxylate is silver abietate.

6. The decorating composition of claim 1 wherein the amine is selected from the group consisting of primary and secondary amines.

7. The composition of claim 2 wherein the silver carboxylate is silver naphthenate.

8. A decorating method which comprises applying to an article to be decorated the decorating composition of claim 1 and firing the applied decorating composition to a metallic silver film.

9. A decorating method which comprises applying to an article to be decorated the decorating composition of claim 2 and firing the applied decorating composition to a metallic silver film.

References Cited by the Examiner

UNITED STATES PATENTS

| | | | |
|---|---|---|---|
| 2,273,613 | 2/1942 | Bartoe | 117—35 |
| 2,466,925 | 4/1949 | Brauner. | |
| 2,483,440 | 10/1949 | Shaw et al. | 260—430 |
| 2,539,728 | 1/1951 | Brewerton et al. | 260—430 |
| 2,695,275 | 11/1954 | Gray | 106—1 X |
| 2,776,915 | 1/1957 | Oosterhout et al. | 106—1 X |
| 2,879,175 | 3/1959 | Umblia et al. | 117—35 |
| 2,984,575 | 5/1961 | Fitch | 106—1 |
| 2,994,614 | 8/1961 | Fitch | 106—1 |

ALEXANDER H. BRODMERKEL, *Primary Examiner.*

NORRIS LIEBMAN, *Examiner.*

J. E. CARSON, J. B. EVANS, *Assistant Examiners.*